US007404591B2

(12) United States Patent
Bender

(10) Patent No.: US 7,404,591 B2
(45) Date of Patent: Jul. 29, 2008

(54) UTILITIES CONNECTION FOR MOTOR VANS OR HOUSE TRAILERS

(75) Inventor: Steffen Bender, Eschenburg (DE)

(73) Assignee: Reich KG, Eschenburg (DE)

(*) Notice: Subject to any disclaimer, the term of this patent is extended or adjusted under 35 U.S.C. 154(b) by 425 days.

(21) Appl. No.: 11/117,076

(22) Filed: Apr. 28, 2005

(65) Prior Publication Data

US 2006/0162971 A1 Jul. 27, 2006

(30) Foreign Application Priority Data

Apr. 29, 2004 (DE) ...................... 20 2004 006 814

(51) Int. Cl.
*B60R 27/00* (2006.01)

(52) U.S. Cl. ...................................................... 296/164

(58) Field of Classification Search ................. 296/164; 403/43, 52, 53, 59, 65, 119, 164
See application file for complete search history.

(56) References Cited

U.S. PATENT DOCUMENTS

| | | | | | |
|---|---|---|---|---|---|
| 4,283,072 | A | * | 8/1981 | Deloach, Jr. | 280/422 |
| 5,129,828 | A | * | 7/1992 | Bass | 439/35 |
| 5,816,824 | A | * | 10/1998 | White et al. | 439/35 |
| 5,904,261 | A | * | 5/1999 | Belinky et al. | 220/3.9 |
| 6,019,386 | A | * | 2/2000 | Morelock | 280/507 |
| 6,076,691 | A | * | 6/2000 | Belinky et al. | 220/3.9 |

* cited by examiner

*Primary Examiner*—H Gutman
(74) *Attorney, Agent, or Firm*—Richard M. Goldberg

(57) ABSTRACT

A utilities connecting unit for connecting motor vans and house trailers with networks or sources of electricity, gas, water, antenna voltage and the like, is inserted into an opening in the floor of the motor van or house trailer. The connecting unit includes a rotatable and/or pivotable arm with integrated utility leads and pipelines, which can be moved between a retracted position and an extended position in such a manner, that, in the extended position, it protrudes laterally from the outline of the motor van or house trailer.

8 Claims, 12 Drawing Sheets

UTILITIES CONNECTION FOR MOTOR VANS OR HOUSE TRAILERS

BACKGROUND OF THE INVENTION

The invention relates to a utilities connection for connecting motor vans and house trailers with networks or sources of electricity, gas, water, antenna, voltage and the like, with an opening in the floor of the motor van or house trailer, into which the connecting unit is inserted.

Various solutions have been proposed for connecting motor vans or house trailers with networks supplying electricity, water, television antenna, etc. Embodiments are known, for which a connecting unit is provided in the region of the side walls of the vehicle. This position is relatively unfavorable. On the one hand, the danger exists of forming thermal bridges, since it is necessary to tamper with the insulation layer of the walls. In view of the fact that the walls of motor vans or house trailers are relatively thin, a construction, moreover, is necessary, which protrudes relatively far to the inside and/or the outside and, if it is on the outside, is exposed to the danger of damage. Embodiments have therefore also become known, for which the connecting unit is located in the floor of the vehicle. However, since in most cases the walls of a corresponding vehicle extend downward over the ground as an apron, access to the connecting units at the underside of the floor is relatively difficult. Moreover, the connecting units tend to become dirty, so that it is troublesome and unpleasant to make the connection.

SUMMARY OF THE INVENTION

It is therefore an object of the invention to provide a utilities connection for motor vans and house trailers, which is readily accessible and to which the utilities lines can be connected relatively easily.

Pursuant to the invention, this objective is accomplished by a utilities connection, which is characterized in that the connecting unit includes a rotatable and/or pivotable arm with integrated utilities lines, which can be moved between a retracted and an extended position in such a manner, that, in the extended position, it protrudes laterally from the outline of the motor van or house trailer.

The arm of the connecting unit can be pulled out into a position, in which it protrudes beyond the outline of the motor van or house trailer. The connecting bushings, which are provided at the arm, are therefore readily visible, since they are no longer hidden behind the covered region underneath the floor and within the apron of the vehicle.

The arm can be extended in various ways. In accordance with a first embodiment, the connecting unit includes a rotatable carrier part, which can be shifted perpendicularly in the floor and from the lower end of which the arm protrudes horizontally. For connecting the utilities lines, the connecting unit can be pulled down vertically and, by rotating the carrier part or the arm in relation to the carrier part, the arm can be swiveled out laterally. The connecting bushings, which are at the end of the arm, are readily accessible here.

In accordance with a different embodiment, the connecting unit once again includes a carrier part, which can be rotated about a vertical axis. The arm can be swiveled at an outer surface of the carrier part between an essentially horizontal and a downwardly directed position. When the outer surface of the carrier part is inclined downward at an angle, it can be achieved that the end of the arm, as it is swiveled down, reaches a position outside of the outline of the vehicle.

In the case of a further embodiment, a carrier part, which once again can be rotated about a perpendicular axis, is provided. The arm can be swiveled about a horizontal axis in relation to the rotatable carrier part and, in this way, hinged downward into a position inclined downward at an angle. In this case, the arm may have a stop surface, which specifies the downwardly inclined position and limits the downward directed swiveling.

BRIEF DESCRIPTION OF THE DRAWINGS

In the following, preferred examples of the invention are described in greater detail by means of the attached drawing, in which.

DETAILED DESCRIPTION

Independently of the individual embodiments, the inventive connecting unit consists of a carrier part, which is mounted firmly or movably at the underside of a motor van or house trailer, and an arm, which is movable in relation to the carrier part or with the carrier part, so that it can be shifted from a hidden position underneath the motor van or house trailer into a position protruding laterally beyond the motor van.

Figure 1:
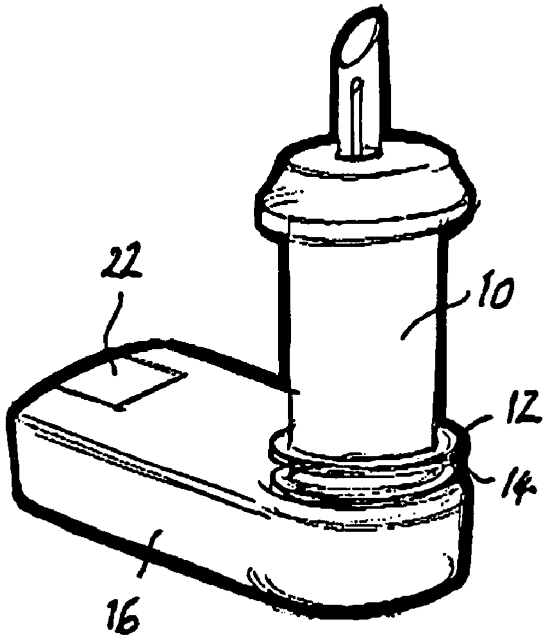
FIG. 1 shows a perspective representation of a first embodiment of an inventive connecting unit.

A first embodiment of the invention is shown in FIGS. 1 to 7. It includes an essentially cylindrical carrier part 10, which can be shifted vertically in relation to the floor (not shown) of a motor van or house trailer. Two rings 12, 14 border the floor (not shown) of the motor van. It can therefore be seen that the connecting unit is shown in FIG. 1 in the upwards pushed position. On the other hand, in FIG. 2, the carrier part is shown in the downwards extended position in relation to the floor.

A horizontal arm 16 extends from the lower end of the carrier part. In its position in the flow of the vehicle, the carrier part 10 can be rotated about a perpendicular axis, so that the arm 16 can be swiveled in a horizontal plane. Alternatively, the arm 16 can also be swiveled about a perpendicular axis in relation to the carrier part 10, which can be shifted only vertically.

Arrows 18, 20 are intended to indicate that the connecting unit and especially its arm can be lowered downward and swiveled about a perpendicular axis.

At the free end of the arm 16, there is a cover 22, behind which the connections 24, 26 for water and low-voltage (12 V) can be recognized. The corresponding connecting pipelines and leads extend through the horizontal arm of box-like cross-section and the carrier part 10 and emerge above the floor of the vehicle through lines 28, 30. A connecting line is labeled 32 and can be coupled in the direction of arrow 34 to the connections 24, 26. FIG. 3 corresponds to FIG. 2 and, accordingly, has essentially the same reference numbers; however, behind the cover 22, it has a socket 36 for 230 V.

Figure 2:
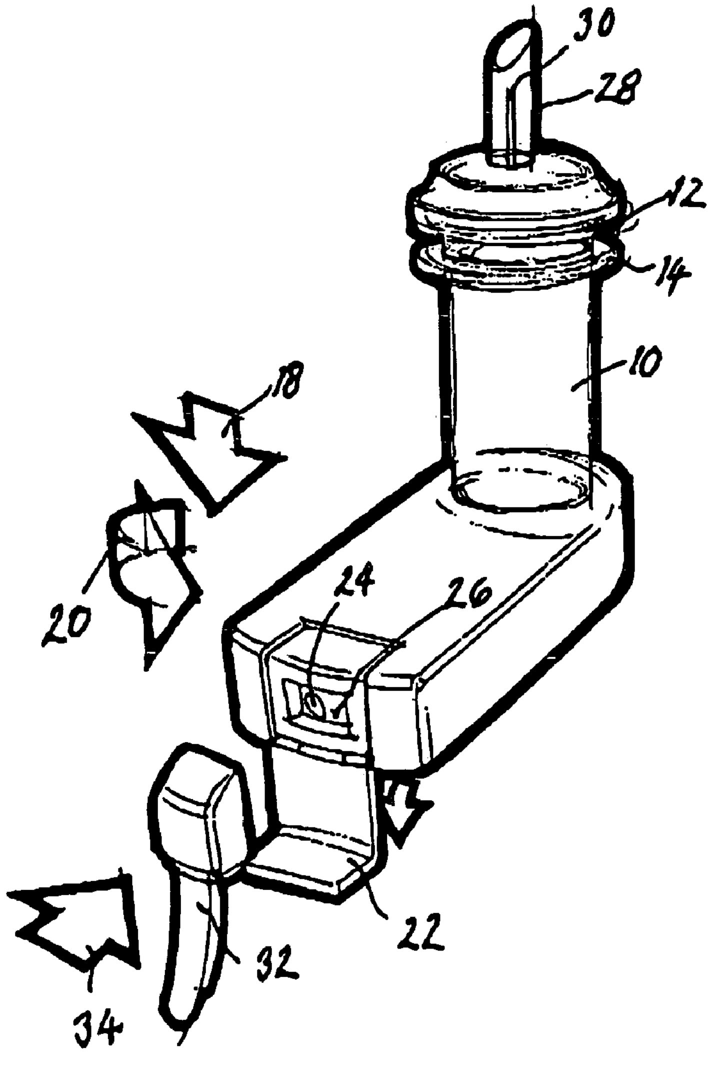
FIG. 2 shows a connecting unit of FIG. 1 in a different position, FIG. 3 corresponding to FIG. 2, is concerned with the connection of 220 volt electricity, FIG. 4 corresponds to FIGS. 2 and 3, but is concerned with a different application.
Figure 3:
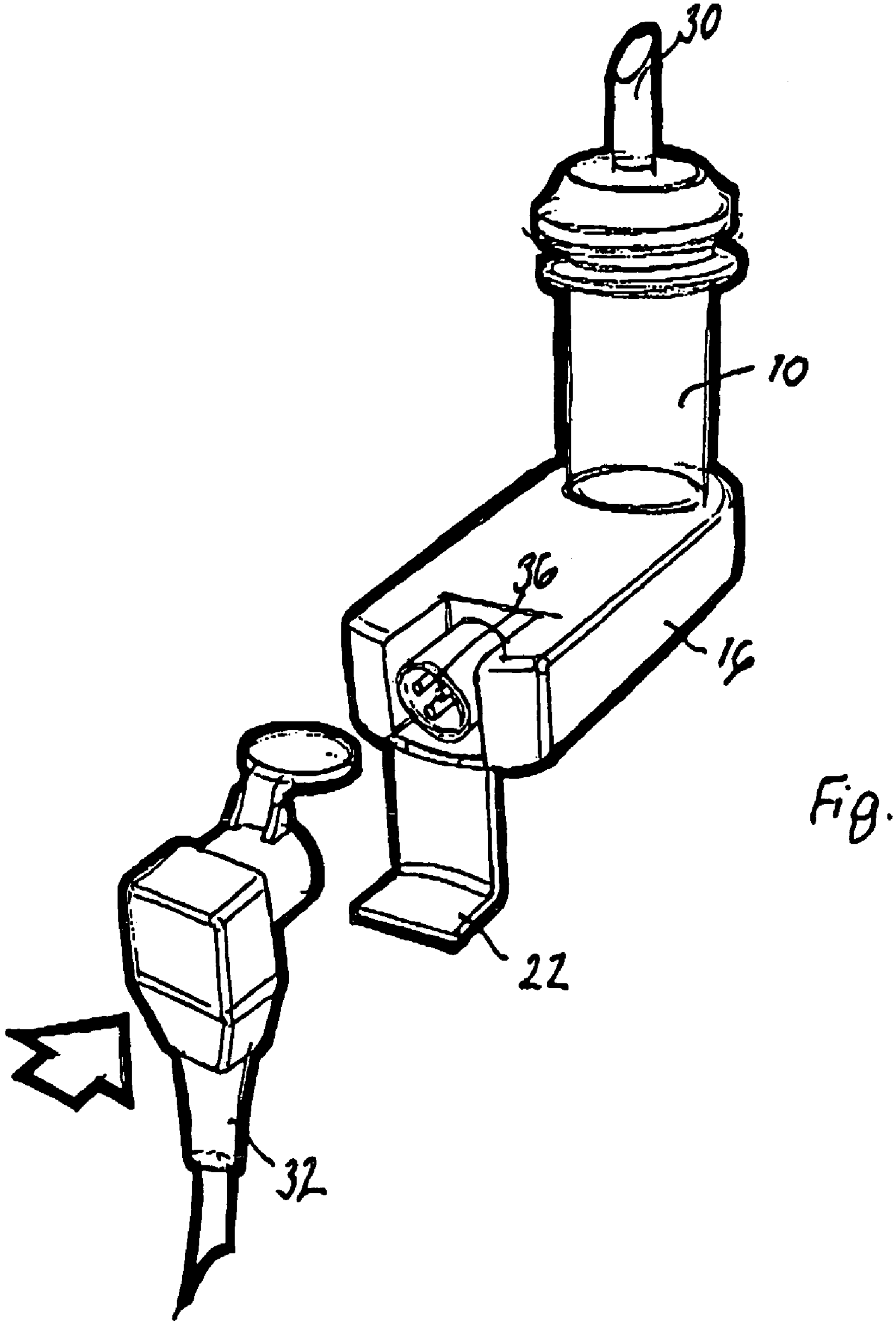
Figure 4:
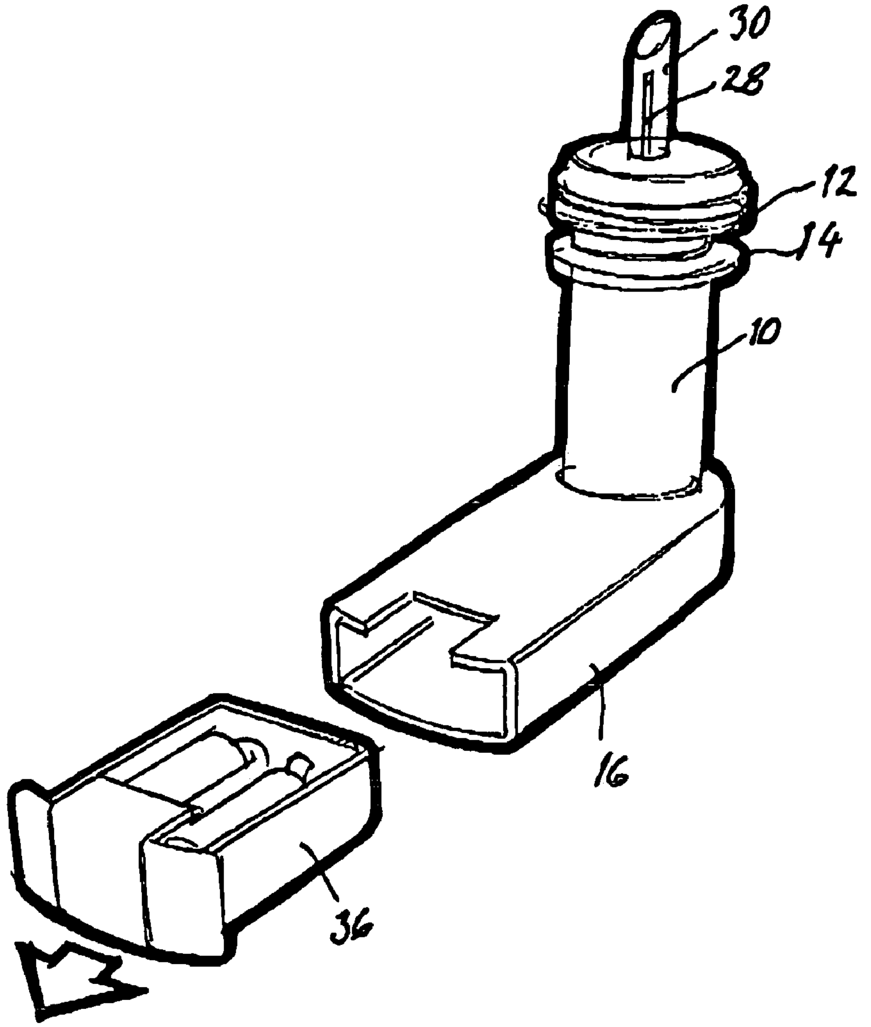

FIG. 4 once again corresponds to FIGS. 1 and 2. However, it shows an arm 16, which is primarily suitable for a water connection. Within this box-shaped arm 16, there is a removable housing 36, which is constructed in a form of a drawer and shown additionally in plan view in FIG. 7. In the housing, there is, to begin with, at the side facing the free end, a water connection 38, which permits entry of water into the interior of the motor van or house trailer over a magnetic valve 40 and a pressure-reducing valve 42 over pipelines, which are not labeled individually. For the transition to the pipeline system of the motor van or house trailer, it is necessary to reduce the pressure. A magnetic valve is provided so that water with a relatively high mains pressure of 4 to 5 bar is permitted to flow in only when a tap in the interior of the motor van is actuated.

Figure 5:
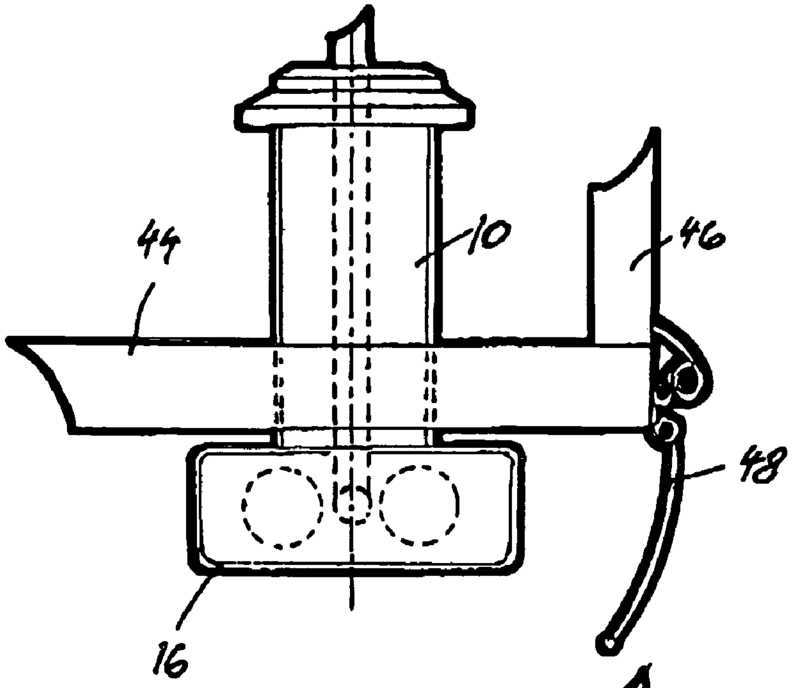
FIG. 5 is a diagrammatic side view of an embodiment of FIG. 4.
Figure 6:
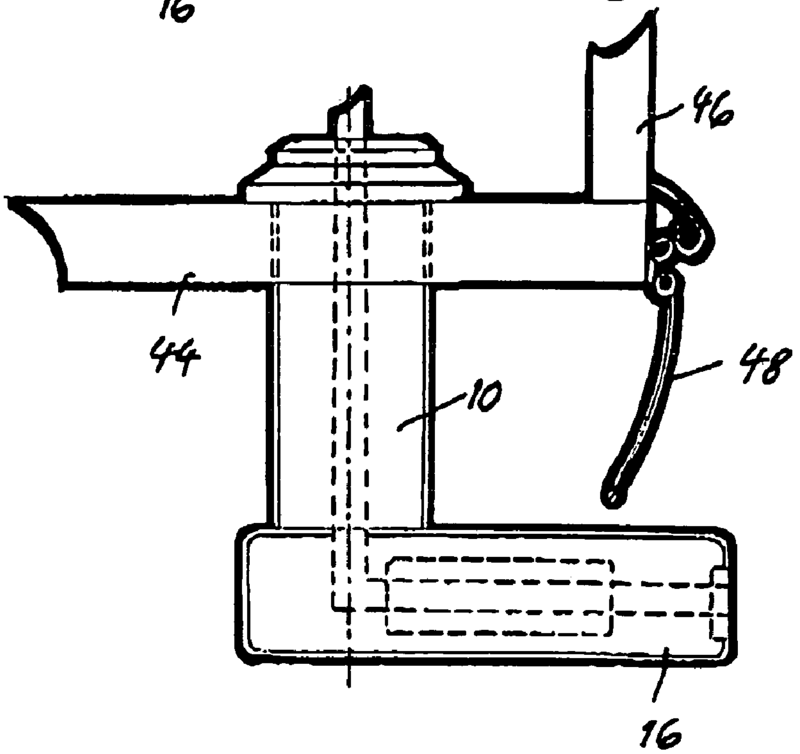
FIG. 6 shows the embodiment of FIG. 5 in a different operating position.

FIGS. 5 and 6 are sectional representations of the previously described embodiment. FIG. 5 shows the connecting unit with the carrier part 10 raised and FIG. 6 shows the connecting unit with the carrier part lowered and with the arm 16 swiveled out laterally. The floor of the motor van is labeled 44 and the side wall 46. In this respect, the representation is strictly diagrammatic. A metal profile 48, bordering the lower edge of the house trailer, has the function of an apron. A comparison of FIGS. 5 in 6 shows that the connecting unit 10, 16, can be retracted behind the apron in the inoperative position and protrudes from under the apron 48 in the use position (FIG. 6).

Subsequently, a second embodiment of the invention is to be described with reference to FIGS. 8 to 13. This second embodiment of FIGS. 8 and 9 has a block-shaped carrier part 50, which is fastened to the underside of the motor van and has to penetrate through the floor only with one line 52. This construction is particularly advantageous, since the carrier part does not have to be pushed into the interior of the house trailer and does not interfere here.

Figure 8:
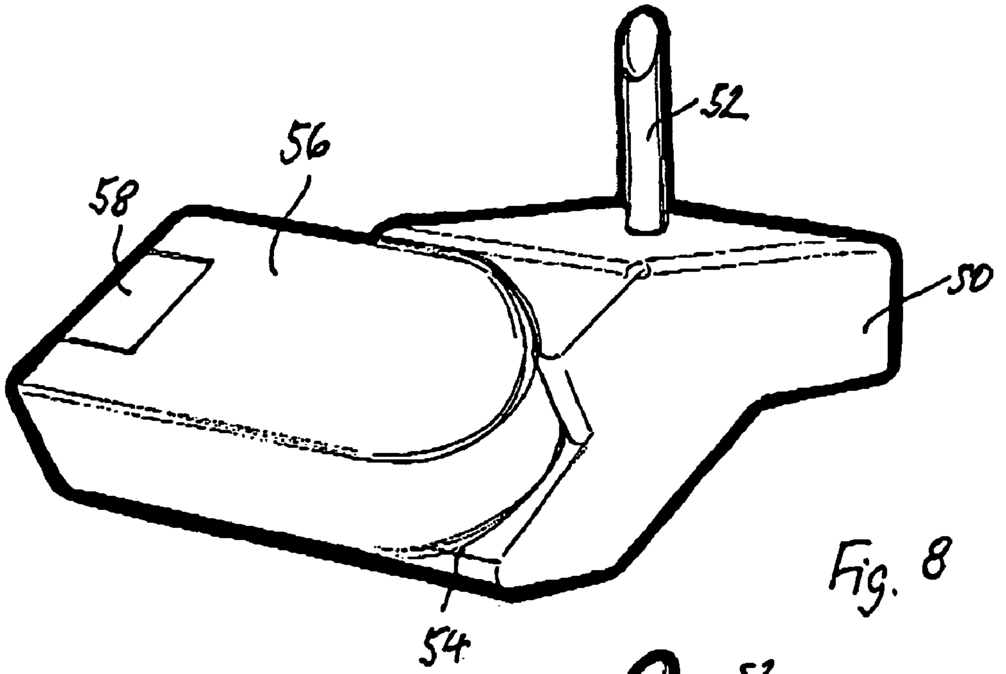
FIG. 8 is a further embodiment of an inventive connecting unit.
Figure 9:
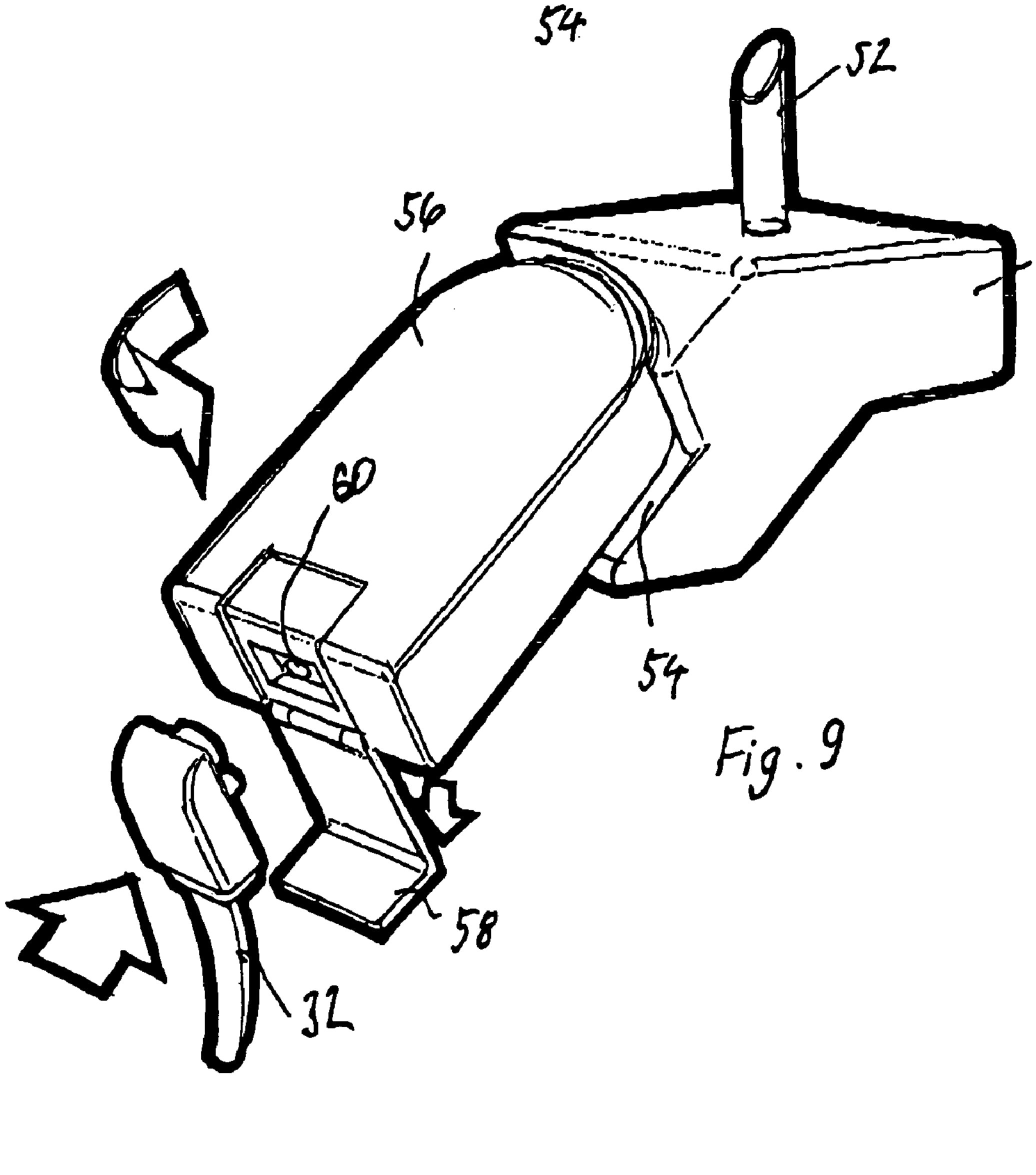
FIG. 9 shows the embodiment of FIG. 8 in a different operating position.
Figure 10:
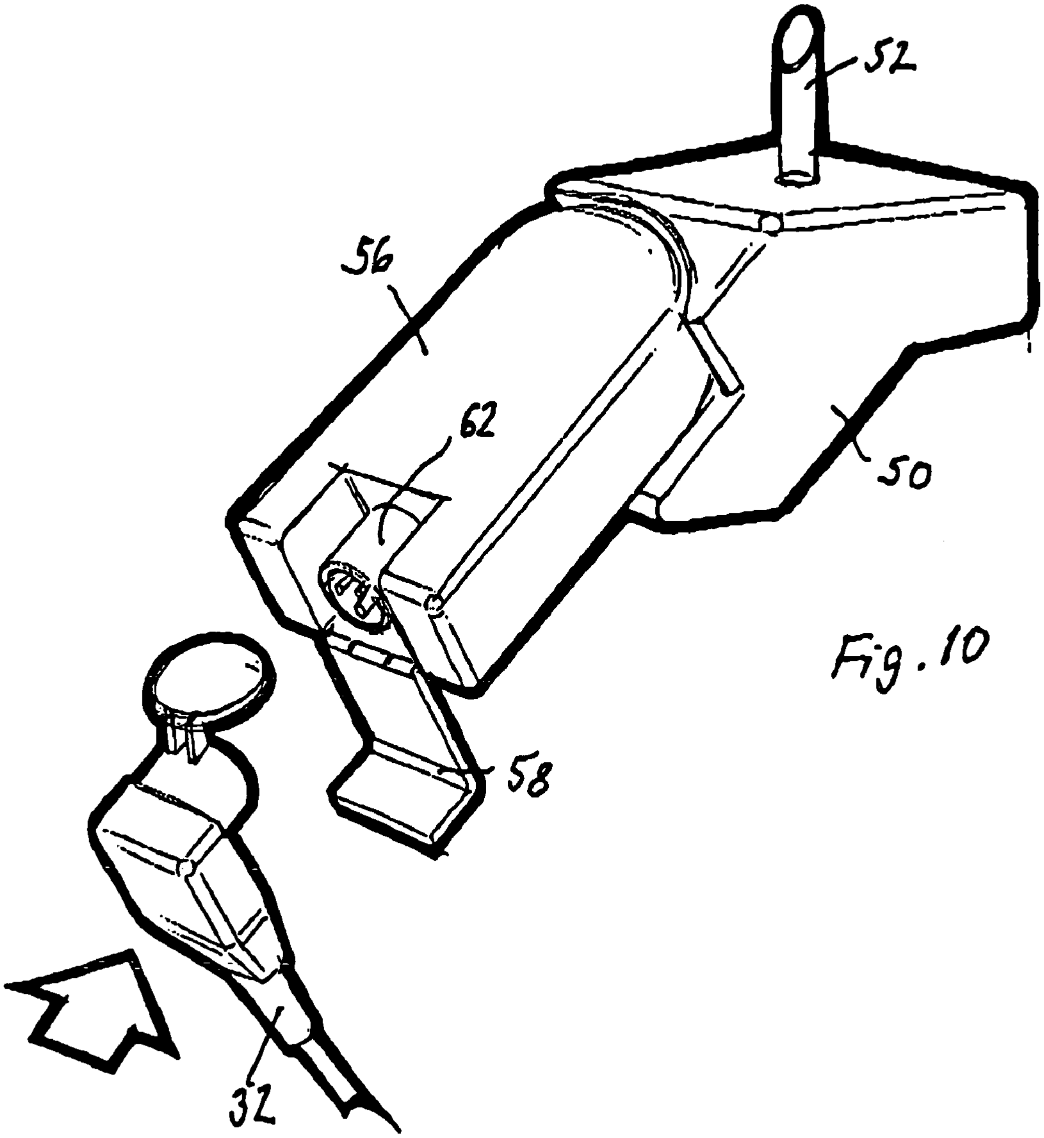
FIG. 10 shows a modified embodiment of FIGS. 8 and 9.

At the carrier part 50, there is an outer surface 54, which is inclined downward at an angle and on which an arm 56 is pivotably mounted in such a manner, that the arm 56 can be moved from a position turned upward into a horizontal position of FIG. 8 into a position of FIG. 9, in which it is directed downward at an angle. The arrangement is such that the arm 56 in the downwards turned position protrudes beneath the apron 48, as will be explained later on in detail by means of FIGS. 12 and 13.

At the free end of the arm 56, there is once again a cover 58, behind which the various connections are hidden. The cover 58 in the upwards turned position covers a water connection 60 in FIG. 9, a 230 V electricity connection 62 in FIG. 10 and a pressure-reducing device in FIG. 11 for reducing the mains pressure in relation to the internal pressure in the pipeline system of the vehicle. The reference numbers of FIGS. 8 and 9 essentially are used in FIGS. 10 and 11. FIG. 11 once again shows a housing 36, which is similar to that shown already in conjunction with FIG. 7.

FIGS. 12 and 13 again illustrate the nature of mounting the connecting unit of FIGS. 8 to 11 at the house trailer or motor van. The floor once again is labeled 44 and the side wall 46. The lateral apron at the house trailer or motor van is labeled 48. The carrier part 50 is fastened at the underside of the motor van or house trailer behind the apron 48 in such a manner that, by swiveling the arm 56, this arm is pressed back behind the apron 48 or extended underneath the apron. It can be seen that valves, contained in the interior of the arm 56, are connected with a pipeline in the carrier part 50, which establishes a connection to the interior of the house trailer or motor van.

Figure 14:
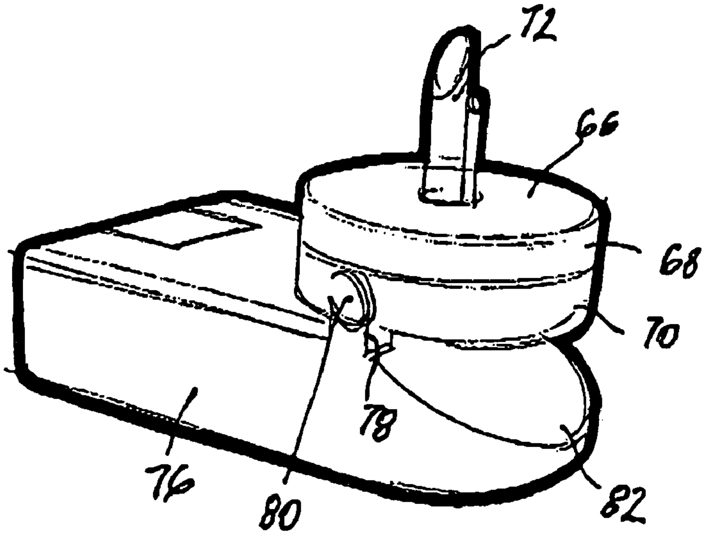
FIG. 14 shows a further embodiment of the invention, FIG. 15 corresponds to FIG. 14, but shows a different operating position.
Figure 15:
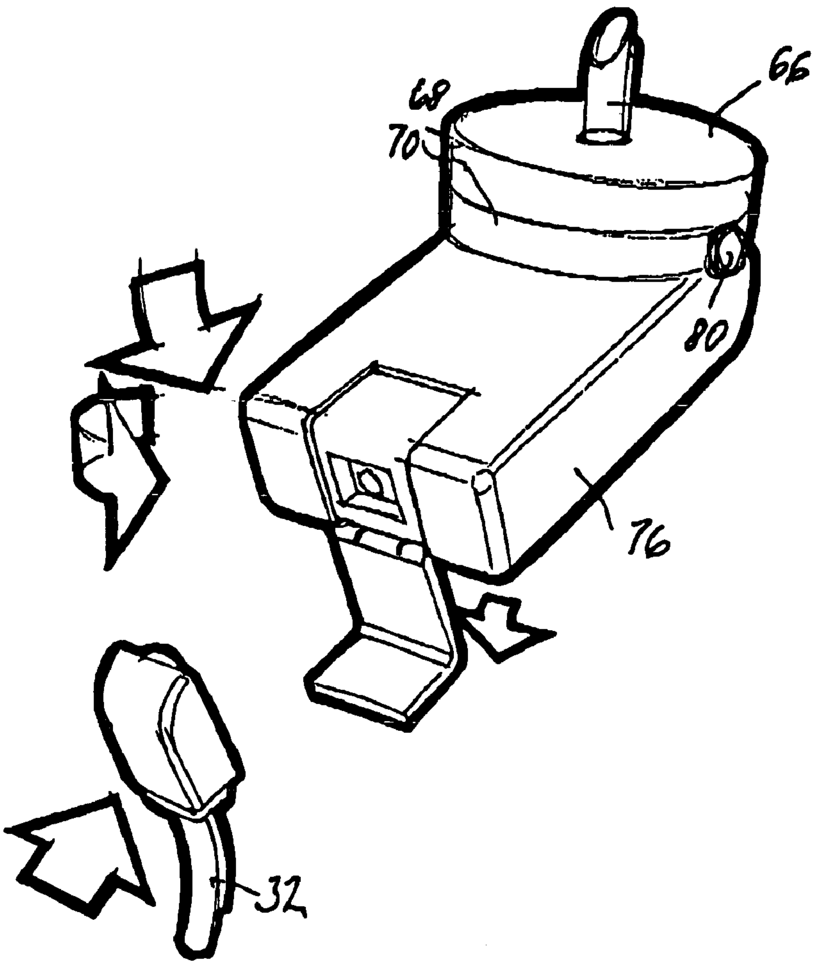
Figure 16:
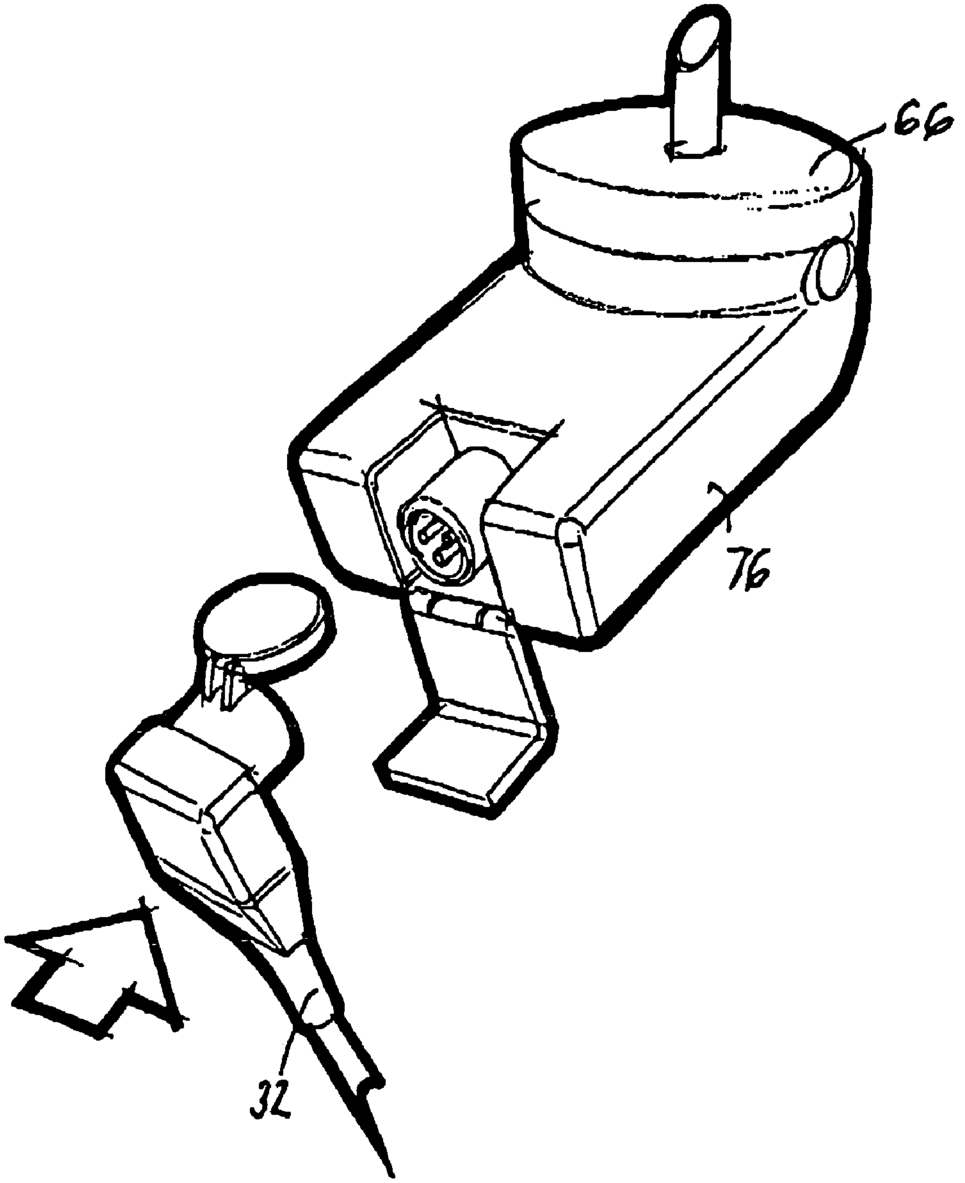
FIG. 16 shows the embodiment of FIG. 15 with a different intended use.
Figure 17:
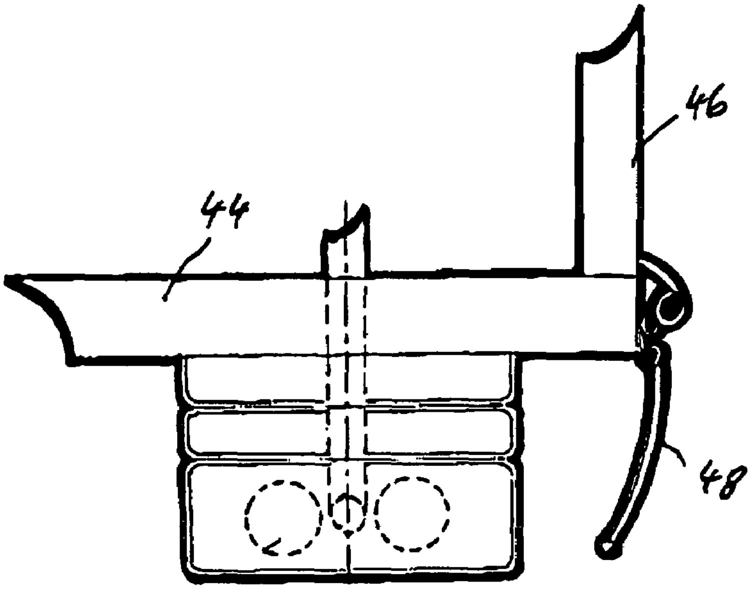
FIG. 17 shows an embodiment of FIG. 14 in a vertical section and FIG. 18 shows the embodiment of FIG. 15 in a vertical section.
Figure 18:
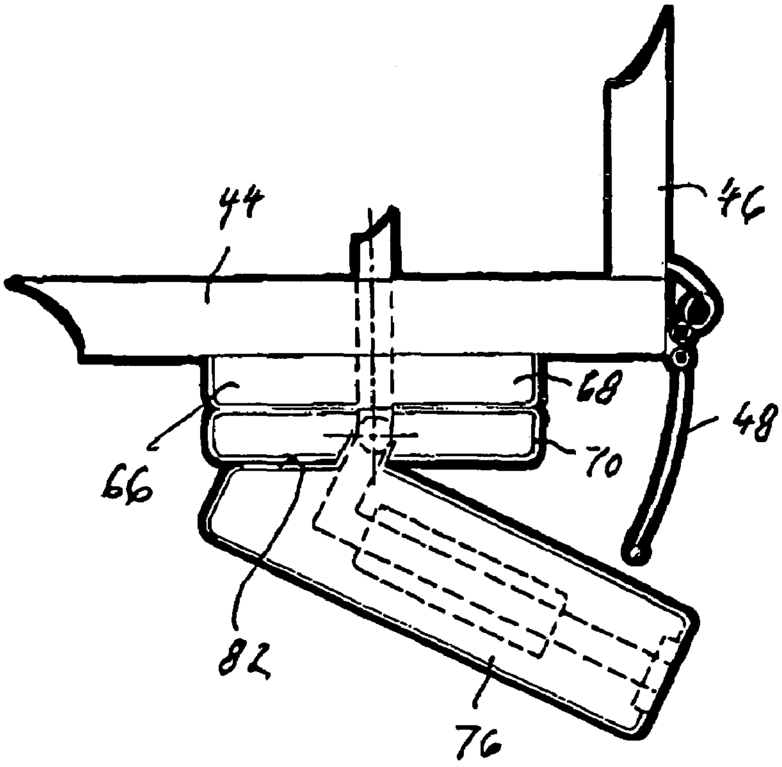

FIGS. 14 to 16 describe a third embodiment of the invention in perspective representations. FIGS. 17 and 18 show corresponding vertical sections.

According to FIGS. 14 and 15, a carrier part 66 is provided which, for the embodiment shown, includes two disks 68, 70, which can be rotated in relation to one another about a common axis. The upper disk 68 is to be fastened to the underside of the floor of the motor van. On the other hand, the lower disk 70 can be rotated in relation to the upper disk 68 about a vertical axis. Lines 72, lead to the interior of the house trailer, as will be explained in greater detail later on by means of FIGS. 17 and 18.

An arm 76 has brackets 78 on opposite sides, of which only one is shown in FIGS. 14 and 15. The two brackets carry a common axis 80, which passes transversely through the lower disk 70 of the carrier part 66. The arm can be swiveled up and down in this way about the axis 80. At its rear end, the arm 76 has an inclined surface 82, which makes it possible that the arm 76 can be swiveled downward only over a limited angle, since the surface 82 functions as a stop surface.

The downward folded position is shown in FIGS. 15 and 16. These two Figures are different only owing to the fact that one shows a connection for 230 V.

In FIGS. 17 and 18, a vertical section, corresponding to the already discussed representations, is shown. The floor of the motor van is labeled 44 and its side wall 46. At the lower edge of the side wall 46, there is, once again, the already previously described apron 48. It can be seen, particularly in FIG. 18, that the inclined surface 82 of the arm 76 functions as a stop to limit the swiveling of the arm 76. It can also be seen that, in the pulled out position, the arm 76 reaches underneath the apron 48 and is therefore readily accessible from the outside.

The embodiment described last also has the advantage that an attachment completely below the floor of the house trailer is possible and that only the lines themselves have to be taken to the inside.

Figure 7:
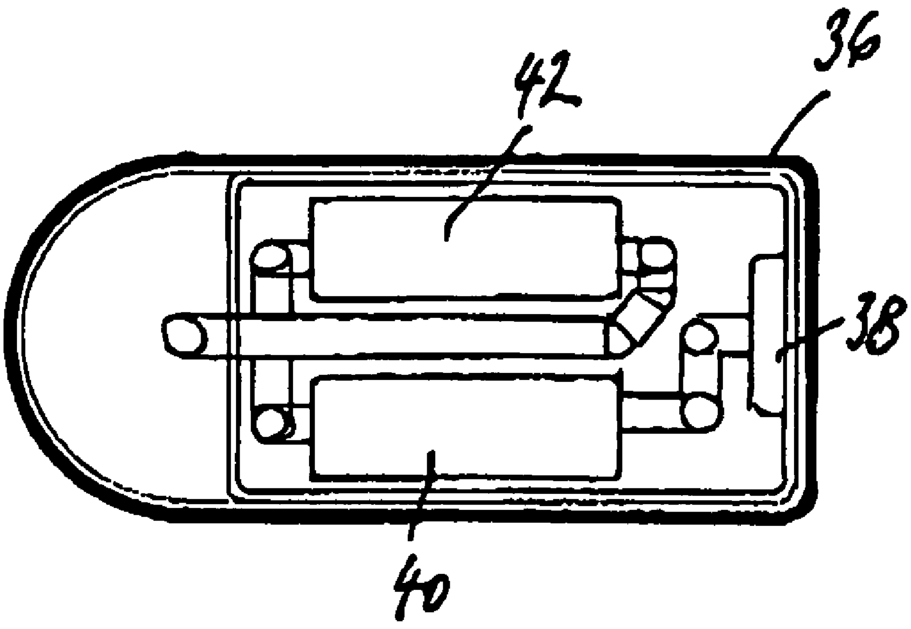
FIG. 7 is a partial representation of the embodiment of FIG. 6.
Figure 11:
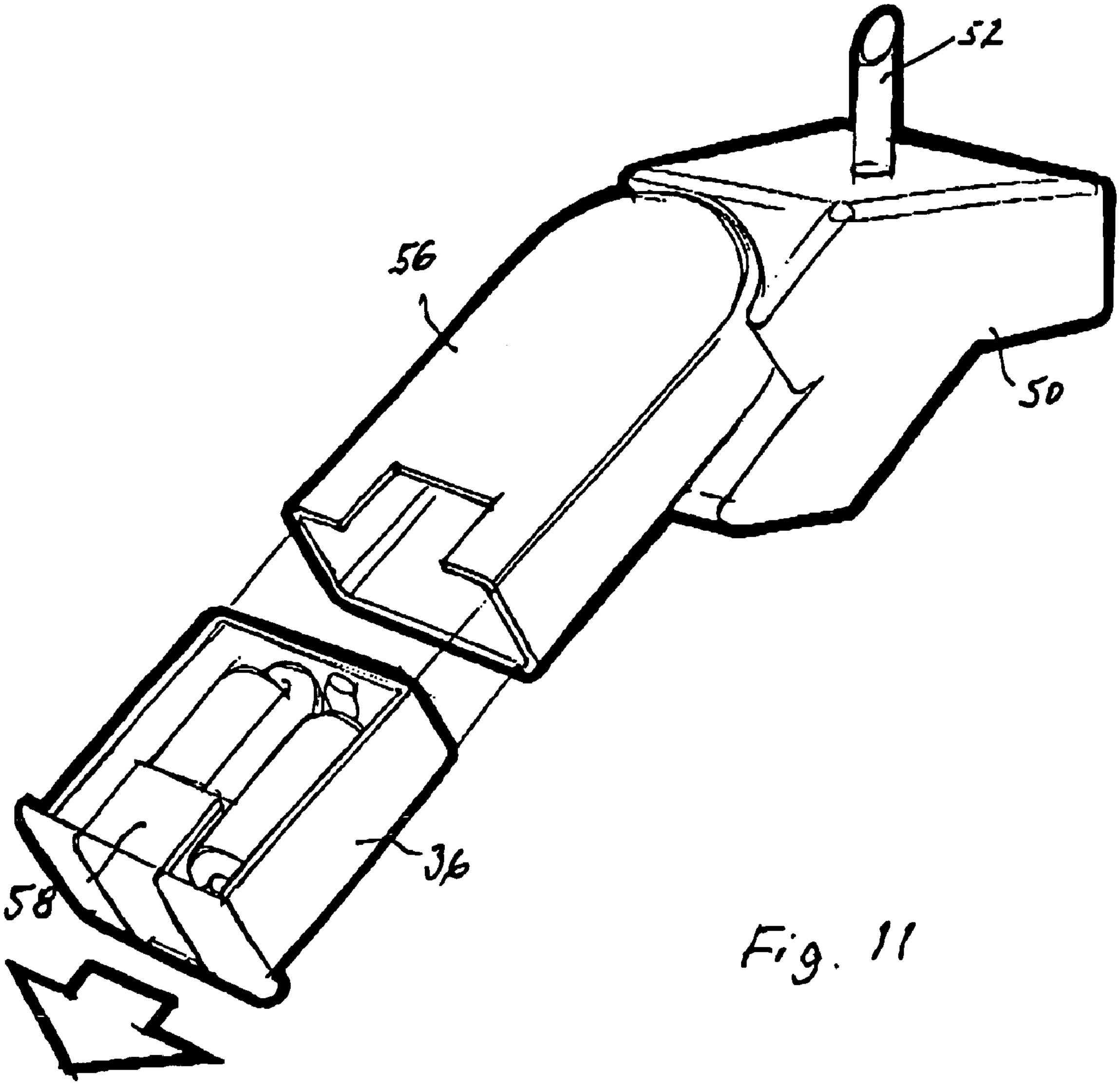
FIG. 11 shows a further modified embodiment, FIG. 12 corresponds to FIG. 8, but shows a vertical section, FIG. 13 corresponds to FIG. 9, but is a vertical section.
Figure 12:
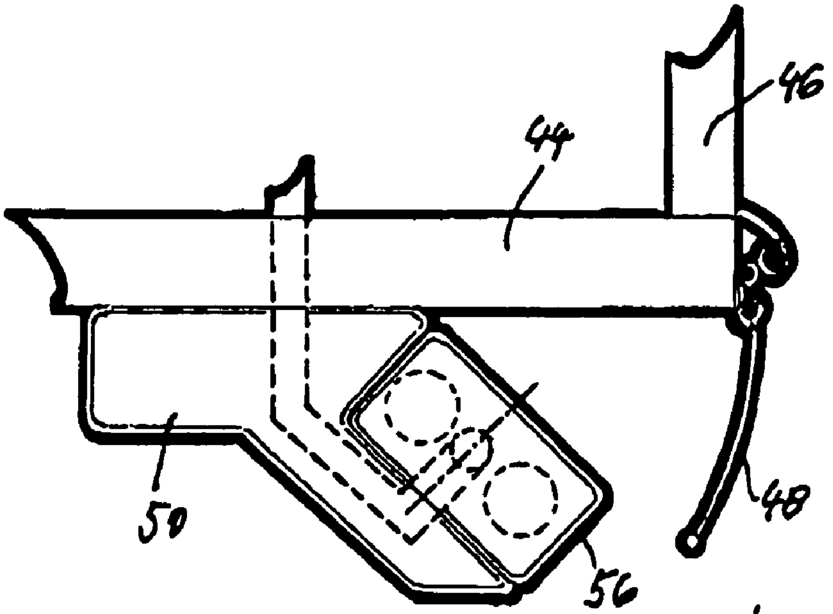
Figure 13:
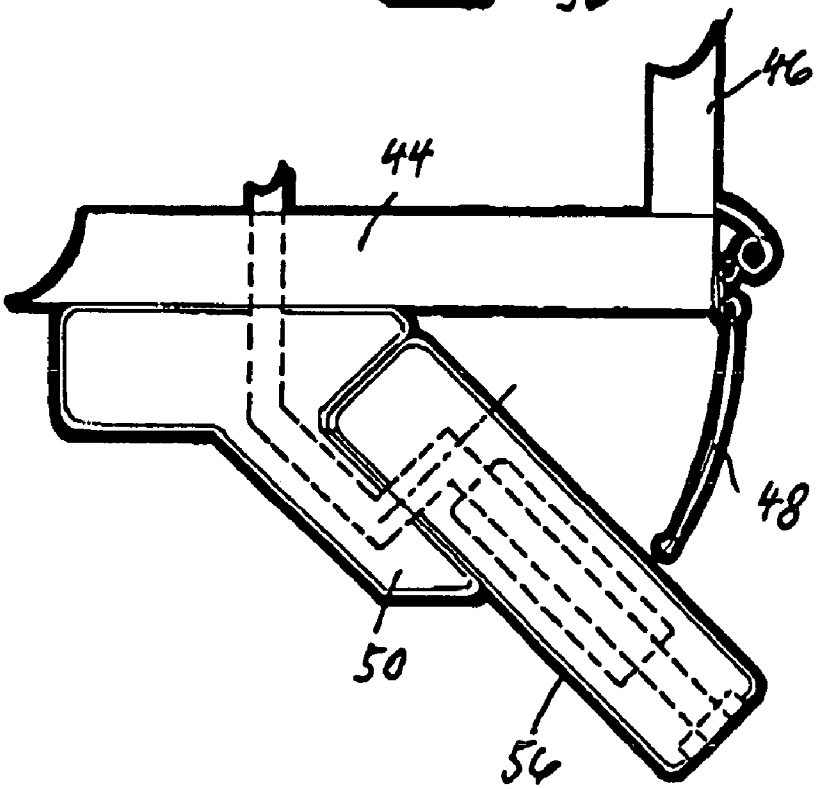

The housing 36, which is shown in FIGS. 7 and 11 and which contains the shutting off and reducing valves of the mains water supply, can be taken out since the water from the valve can be emptied completely only with relative difficulty and therefore, when there is a danger of frost, the housing 36 can be secured by being removed. Alternatively or in addition, heating devices may be provided, which prevent freezing of the carrier parts 10, 50, 66 and the associated arms 16, 56, 76.

What is claimed is:

1. Utilities connecting unit for connecting motor vans and house trailers with networks or sources of electricity, gas, water, antenna, or voltage through an opening in a floor of a motor van or house trailer, into which the utilities connecting unit is adapted to be inserted, the utilities connecting unit comprising:

at least one of a rotatable and pivotable arm with integrated utility leads and pipelines, which can be moved between a retracted position and an extended position in such a manner, that, in the extended position, the at least one of a rotatable and pivotable arm protrudes laterally from an outline of the motor van or house trailer.

2. The utilities connecting unit of claim 1, wherein:

the connecting unit is carried at least one of displaceably and rotatably in the floor of the motor van or house trailer, the connecting unit includes a carrier part, and the arm protrudes horizontally from a lower end of the carrier part.

3. The utilities connecting unit of claim 1, wherein:

the connecting unit includes a carrier part, which is mounted vertically displaceably in the floor of the motor van or house trailer and which includes a lower end, and the arm is mounted in a swiveled manner about a perpendicular axis in relation to the carrier part, and protrudes in a horizontal direction.

4. The utilities connecting unit of claim 1, wherein:

the connecting unit includes a carrier part, which can be shifted vertically and rotated in the floor of the motor van or house trailer and which includes a lower end, and the arm protrudes in a horizontal direction in relation to the carrier part.

5. The utilities connecting unit of claim 1, wherein:

the connecting unit includes a carrier part, and the arm, lying in contact with an outer surface of the carrier part, is mounted in a swiveled manner between an essentially horizontal and a downward directed position.

6. The utilities connecting unit of claim 5, the carrier part includes an outer surface which is inclined downward at an angle.

7. The utilities connecting unit of claim 1, wherein:

the connecting unit includes a carrier part, which is mounted for rotation about a vertical axis, and the arm is mounted at the carrier part, so that the arm is adapted to be swiveled about a horizontal axis and, folded down into a position, which is directed downward at an angle.

8. The utilities connecting unit of claim 7, wherein the arm has an inclined surface, which contacts the carrier part at a specified, inclined, downwardly directed position in relation to the carrier part and limits the swiveling.

* * * * *